Aug. 18, 1931.  V. PAQUIT  1,819,477
RADIO RECEIVING APPARATUS
Filed Nov. 6, 1925
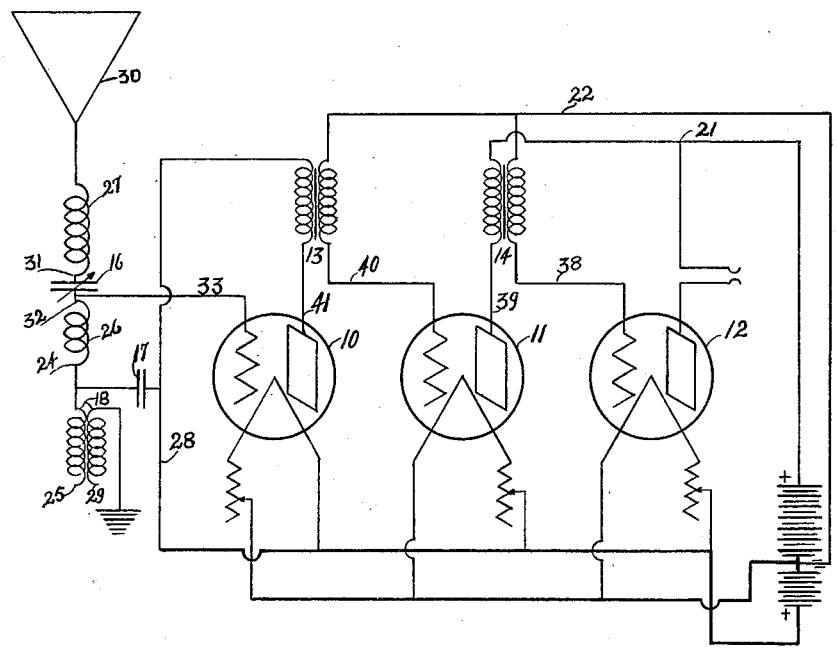
INVENTOR.
Vital Paquit
BY Patented Aug. 18, 1931

1,819,477

UNITED STATES PATENT OFFICE

VITAL PAQUIT, OF NEW YORK, N. Y.

RADIO RECEIVING APPARATUS

Application filed November 6, 1925. Serial No. 67,394.

My invention relates to radio receiving apparatus in general and has for its object to provide apparatus which are easy to operate, simpler in construction and amplification method, loud, clear, and squealess, and capable to operate with improved reception under heavy static conditions, or lightning.

The objects and advantages of this invention will be apparent by reference to the following description taken in connection with the accompanying drawing in which: The figure is a wiring diagram of the system embodying this invention.

To attain this object, I provide my apparatus with a single control, means of operation, which operates the tuning system by means of a single variable condenser connected between the primary and secondary winding of my inductance coil which has its windings appropriated in suitable proximity, and in which the secondary winding is provided with a by pass condenser that I use to permit the said winding to be connected to the positive side of my A battery and enable the detector tube of my apparatus to operate with its grid and plate returns both connected on the positive side of my six volts A battery in combination with a plurality of audio transformers and tubes consecutively connected from one to another in the form hereafter fully described with reference to the accompanying diagram of connections.

Referring to my inductance coil, winding 27 is the primary and winding 26 the secondary winding of said coil. They are appropriated upon a bakelite tube four and one half inches long and three inches in diameter, and one eighth of one inch space separates the two windings for the purpose of sharper selectivity. Both windings are wound in the same direction and vary in wire gauge, insulation and number of turns. The primary winding 27 comprises 75 turns of wire gauge #20 single cotton covering, and secondary winding 26 comprises 37 turns of wire gauge #30 double cotton covering. A variable condenser 16 of .0003 Mfd capacity is connected between the two windings 26 and 27 for the purpose of selecting the signal of a desired station. Antenna 30 is connected to primary winding 27 which has its end 31 preferably connected to the stationary plates of the condenser 16 for the purpose of avoiding hand capacity when tuning. The secondary winding 26 has end 32 connected to the rotary plates of the condenser and with the grid of the detector tube 10 by means of connection 33, and end 24 of the later named winding is connected to a fixed condenser 17 of .8 Mfd capacity which has the function of a by pass condenser to inductively connect the secondary winding to the positive side of the A battery as shown by connection 28. This arrangement of connections for the detector tube is characteristic and secures the apparatus against squealing. As shown in the diagram of connections, the antenna winding is not grounded and the ground connection goes to the A battery by means of a coil 18 which is not necessary if desired otherwise. This coil has two windings, 25 and 29 both of which remain in open circuit. Winding 29 is connected to the ground and winding 25 is connected to end 24 of secondary winding 26 and to the A battery throughout fixed condenser 17, as for instance, to the positive of the battery. These two windings are made up with the same kind of wire gauge and insulation, and comprise 110 feet of wire gauge #28 double cotton covering for each winding. A tube of insulating material conveniently appropriated provides the means to wind the two windings one upon the other within a small space, and the number of turns and insulation of the wire determine the inductive capacity between the two windings to effectively connect the ground to the apparatus. To amplify the signal of a tuned in station and render it audible through a loud speaker, I use audio transformers connected in the form hereafter described with a three tubes connection. As illustrated in my drawing, there are two audio transformers 13 and 14. Both transformers have one side of the secondary thereof connected to the negative side of the A and B batteries by means of connection 22. Transformer 13 has one side of its primary connected to the plate of detector tube 10, as shown by connection 41, and the other side of the primary connected to the plus 6 volts A battery by means of connection 28 which characterizes the connection of this transformer, in that it permits to use all audio transformers for amplification. The grid of tube 11 is connected to the secondary of the transformer as shown by connection 40 and thereby complete the connections for this transformer. Transformer 14 has a connection 39 connecting the plate of tube 11 to one side of its primary from which connection 21 complete the circuit of the plate on the 90 volts plus B battery. Connection 38 connects the secondary of this transformer to the grid of tube 12 which has its grid element return to the minus of the A and B batteries, as shown by connection 22, and a single circuit jack provides the means for connection of a loud speaker which has the connection 21 connecting one side of the jack, and the plate of tube 12 connecting the other side of the jack. The vacuum tubes that I use are of ordinary type, that is 201A or 301A tubes for which I provide individual control by means of a 12 ohms regulable resistance that I connect in the ordinary fashion but always with the audio amplification tubes regulated on the positive side of the filament current, and the detector tube regulated on the negative side of the filament current, and although I mention individual control for my audio amplification tubes, same may be regulated with a single resistance. The use of resistance in an electrical circuit is well known in the art and for this reason I believe that the diagram of connections illustrating the filament control of the tubes is sufficient for reference thereto.

Referring to my description and drawing, I refer to a three tube connection with two audio transformers. But if further amplification is desired for certain distant stations, same may be had with additional audio transformers and tubes connected in the form described. That is, if a fourth tube is desired, the plate element of the third tube will be disconnected from the jack and connected to the primary P side of a third audio transformer from which the plate of the third tube will have its return on the plus 90 volts B battery through the primary of the transformer. The fourth tube will have its grid element connected to the secondary G side of the third audio transformer from which the return of the grid will be made on the negative of the A and B batteries through the secondary of the transformer, and the plate element of the fourth tube will then be connected to the disconnected jack. If five or more tubes are used, same will have their audio transformer connected as indicated for the first audio transformer and placed in succession therewith from which it appears that the method of amplification is simple, with which the arrangement of a single variable condenser in my apparatus and the function of my detector tube constitute a marked improvement in radio receiving apparatus.

In my description, I refer to an inductance coil having 75 turns of wire gauge #20 s. c. c. in its primary, and 37 turns of wire gauge #30 d. c. c. in its secondary. With this coil, wave lengths ranging from 200 to 650 meters are covered, and although this range of wave length is the most satisfactory for listeners, higher wave or lower wave may also be had by changing the number of turns in the coil, as well as the capacity of the variable condenser operating in conjunction therewith. If desired, the size of wire and insulation thereof may also be changed, and so is, the space between the primary and secondary winding. In the art, it is well known that inductance varies with space between winding. It is equally well known with radio inductance coil, that if for a given wave length we vary the number of turns in said coil, the capacity of the variable condenser operating in conjunction therewith, will have to be varied accordingly. For these reasons, it is obvious that changes may be made in my inductance coil, or variable condenser, to suit the requirements of practical use relating to selectivity, wave length, or loudness, for which, with apparatus of the class described, the secondary of the inductance coil will be most efficient by providing the circuit with a number of turns, half to that of the primary circuit, accuracy having to be had by trials.

If desired, the capacity of my fixed condenser 17 may be varied to a certain extent, downward and upward. This would permit to regulate more effectively the sensitivity of my detector tube, and therefore, a condenser of the class mentioned with selective capacities may be provided for that purpose.

It will thus be seen that there is herein described apparatus simple in construction and operation, and in which the several features of this invention are embodied, and as changes can be made without departing from the spirit of my invention, it is intended that all matter contained in the above description or shown in the accompanying drawing shall be interpreted as illustrative and not in a limiting sense, and

What I claim is:

1. In radio receiving apparatus comprising a three-electrode vacuum tube detector and sources of current for supplying its circuits, the combination of a single tuning coil with two windings, a variable condenser connected between said windings, the antenna connecting to one terminal of said coil, the grid element of the detector tube connected to said variable condenser, and a fixed condensed connecting the other terminal of said coil to the positive side of the current feeding the filament of the vacuum tubes.

2. In a single control receiving apparatus, in combination, an inductance coil having two windings and a single variable condenser cooperating therewith, a plurality of audio frequency transformers and vacuum tubes connected as described, and a fixed condenser of the class described serially connected between one of said windings and the positive side of the current feeding the filament of said tubes.

3. A vacuum tube detector circuit including a groundless connection for the antenna winding, a secondary winding relatively disposed for mutual induction with said antenna winding, the grid element of said detector positively connected to one terminal of said secondary winding, and a by pass condenser serially connected between the second terminal of said secondary winding and the positive side of the current feeding the filament of said vacuum tube detector.

4. In radio receiving apparatus comprising a three-electrode vacuum tube detector and sources of current for supplying its circuits; the combination of a single tuning coil with two stationary windings, a variable condenser connected between said windings, the antenna connecting to one terminal of said coil, the grid element of the detector tube connecting to said variable condenser, a fixed condenser connecting the other terminal of said coil to the positive side of the current feeding the filament of the vacuum tubes, and inductive coupling from said last named coil terminal to ground.

Signed at New York city in the county of New York and State of New York, October 29, 1925.

VITAL PAQUIT.